United States Patent [19]

Soo et al.

[11] 4,287,414

[45] Sep. 1, 1981

[54] ILLUMINATION AND PICK UP APPARATUS

[75] Inventors: Suk S. Soo, Ossining; Andrew M. Schwartz, Poughkeepsie, both of N.Y.

[73] Assignee: International Business Machines Corp., Armonk, N.Y.

[21] Appl. No.: 53,680

[22] Filed: Jun. 29, 1979

[51] Int. Cl.$^3$ .............................................. G02B 5/14
[52] U.S. Cl. .................................. 250/227; 350/96.1
[58] Field of Search ............... 250/216, 227; 350/96.1, 350/293, 96.28; 235/472, 473; 358/200, 206

[56] References Cited

U.S. PATENT DOCUMENTS

| | | | |
|---|---|---|---|
| 3,060,806 | 10/1962 | Lewis et al. | 350/96.1 |
| 3,328,589 | 6/1967 | Ferguson | 250/227 |
| 3,643,103 | 2/1972 | Du Bois et al. | 250/227 |
| 3,663,083 | 5/1972 | Friedman et al. | 350/96.1 |
| 3,845,297 | 10/1974 | Maeda et al. | 250/227 |

FOREIGN PATENT DOCUMENTS 1088146 10/1967 United Kingdom .

*Primary Examiner*—David C. Nelms
*Attorney, Agent, or Firm*—Pollock, Vande Sande & Priddy

[57] ABSTRACT

An illumination and pickup device including a lucite head with an ellipsoidally shaped wall that is covered with reflective paint. An input source of light is positioned at a first focal line of the ellipsoidal head and the emitted radiation is internally reflected to form an intense slit image at the second focal line of the head. A circularly shaped cylindrical exit portion having its axis at the second focal line is cut at the emitting end of the ellipsoidal head. A flat surface positioned adjacent to the circularly shaped cylindrical portion and in the plane of the second focal line abuts an irradiated surface and thereby defines an alignment position for the ellipsoidal head. Optical fibers are affixed adjacent the cylindrical cut-out portion to receive the light that is reflected from the irradiated surface and to carry the light to a photodetector.

16 Claims, 2 Drawing Figures

ILLUMINATION AND PICK UP APPARATUS

DESCRIPTION

1. Technical Field

The invention relates to optical apparatus for generating a scanning slit of radiation, and, more particularly, to a device that focuses input radiation by internal reflection to form an associated output slit image.

2. Background Art

Lines of print or other characters may be electronically read by illuminating the characters with an intense slit of light and measuring the variations in the intensity of the reflected light. For example, in the U.S. patent to Nelson, No. 3,956,587, there is disclosed an optical read/write head that employs a plurality of optical fibers or a light pipe to carry light from a source of illumination to a small portion of a surface under examination. An optical fiber is employed to carry the reflected light from the irradiated surface to a detector.

Since most commercially available optical fibers do not focus light, it has been necessary in the prior art either to place the radiating ends of the fibers very close to the irradiated surface or to use focusing lenses in order to provide a fairly well-defined and intense slit of illumination. However, focusing lenses add to the expense and complexity of a scanning head. In addition, it has been relatively difficult to maintain the illuminating optical fibers of prior art scanning heads in proper alignment with the surface under examination, particularly if the surface is uneven or if the head is manually moved to scan the surface. Also, for such optical systems, it has generally been necessary to utilize a relatively expensive source of intense radiation, since the radiation is not sharply focused on the surface.

In a prior art illumination system that is disclosed in the U.S. patent to Mizohota et al, No. 4,141,058, optical fibers are employed to carry light to a box having internally reflecting surfaces that diffuse the light and direct the light out of a transparent wall of the box. However, the disclosed internally reflecting light box is not used for irradiating a scanned surface or picking up reflected radiation from the surface.

Accordingly, it is an object of the invention to provide a relatively inexpensive and efficient apparatus for irradiating a surface with a high intensity slit of light and for picking up the light that is reflected from the surface.

Another object of the invention is to provide such an illumination and pickup apparatus that focuses the light from a relatively low intensity source of illumination by internal reflection to form a corresponding high intensity illuminating slit.

These and other objects of this invention will become apparent from a review of the detailed specification which follows and a consideration of the accompanying drawings.

DISCLOSURE OF THE INVENTION

In order to achieve the objects of the invention and to overcome the problems of the prior art, the illumination and pickup device, according to the invention, includes an internally reflecting ellipsoid element that is shaped to receive a light input at one of its focal lines and to focus the light by internal reflection to an intense illuminating slit at its other focal line.

The light output end of the ellipsoid is cut in a circularly shaped cylindrical section having the focal line as its axis. An adjacent flat end portion of the ellipsoid rests on a surface to maintain the focal line in alignment with the surface. The shape of the cut-out section ensures that internally reflected light axits at all points normal to the circular cylindrical surface of the ellipsoid, thereby eliminating defocusing due to refraction at the interface between the surface of the ellipsoid and the surrounding air. Thus, the index of refraction of the material of the ellipsoid does not affect the focusing operation of the ellipsoid.

Pickup optical fibers are affixed adjacent to the irradiating end of the ellipsoid for receiving the light that is reflected from the surface and transmitting the reflected light to a photodetector.

An alternative embodiment of the invention includes an internally reflecting block having pickup optical fibers extending through the block with the ends of the optical fibers facing outwardly in the plane of a transparent irradiating face of the block. A bundle of optical fibers conducts light from a light source into the interior of the block. The incident light is internally reflected and passed by the transparent wall of the block to illuminate a surface. The reflected light from the surface is picked up by the optical fibers embedded in the face of the transparent wall and is transmitted by the fibers to a photodetector.

BEST MODE FOR CARRYING OUT THE INVENTION

Figure 1:
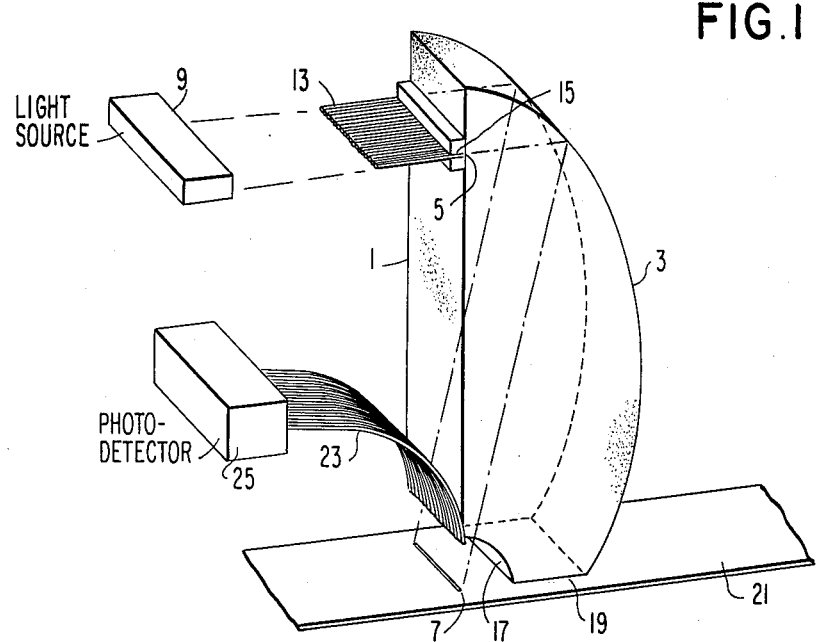
FIG. 1 illustrates a perspective view of an internally reflecting illumination and pickup apparatus in accordance with the invention.

The remaining portion of this specification will describe preferred embodiments of the invention when read in conjunction with the attached drawings, in which like reference characters identify identical apparatus.

FIG. 1 illustrates a perspective view of an ellipsoidal illumination and pickup head in accordance with the invention. The ellipsoidal head 1 may be made of a light transparent material, for example, a clear plastic such as lucite and may be easily and inexpensively formed by molding. As shown in FIG. 1, the curved wall 3 of the ellipsoidal head 1 is shaped to form a portion of an ellipse. It will be appreciated by those skilled in the art that there is defined for the ellipsoidal shape of FIG. 1 an input focal line 5 and an output focal line 7 corresponding to the focal points of the stacked, confocal ellipses defined by the curved wall 3.

A known geometrical property of an ellipse is that light emitted from one focal point of the ellipse is totally reflected from the wall of the ellipse, and is focused at the other focal point of the ellipse. Thus, in accordance with the invention, a light source 9, for example, a light emitting diode, is energized to emit a relatively low intensity light that is focused, for example, by means of a lens (not shown) to a plurality of associated optical fibers 13. The optical fibers carry the light from the light source 9 to the area of the input focal line 5 of the ellipsoidal head 1.

As shown in FIG. 1, a slot 15 my be formed at the input end of the ellipsoidal head 1 to receive the optical fibers 13 and to hold the ends of the optical fibers in position at the input focal line 5. Of course, the optical fibers may be maintained in position by gluing the fibers to the material of the ellipsoidal head 1.

It should be understood that any light transmission means known in the optical art may be employed to carry light from the source 9 to a position along the input focal line 5. In addition, other light sources, for example, an incandescent lamp, may be employed to supply light for the apparatus of the invention. However, it should be understood that, in general, the light source may be of relatively low intensity since the ellipsoidal head 1 serves to focus even a low intensity incident beam to a relatively sharp slit image.

For a preferred embodiment of the invention, all exterior surfaces of the ellipsoidal head, with the exception of a circularly shaped cylindrical wall 17, are covered with reflective material so that the radiation from the input focal line 5 may be internally reflected to the output focal line 7. However, it should be understood that the ellipsoidal head will operate in accordance with the invention if at least the exterior surface of the curved wall 3 is covered with reflective material.

One means for providing a reflective coating to the ellipsoidal head 1 is to sputter aluminum on the outer surface of the head. Alternatively, the head 1 may be coated with a reflective aluminum paint.

As shown in FIG. 1, the irradiating end of the ellipsoidal head 1 is cut to form a circularly shaped cylindrical wall 17 having the output focal line 7 as its axis. Of course, the circularly shaped cylindrical wall 17 is not coated with reflective material since it is necessary for the internally reflected light to emerge from the cylindrical wall 17 to form an intense slit image at the focal line 7.

The cylindrical wall 17 is shaped so that the internally reflected light from the input focal line 5 emerges at all points normal to the surface of the wall. Thus, refraction of light at the interface between the cylindrical wall 17 and the surrounding air is avoided and a sharp slit image is produced.

In operation, the ellipsoidal head 1 may be placed so that a flat alignment end 19 abuts the surface to be examined, for example, a paper 21. It should be understood that the flat surface of the alignment end 19 lies in the same plane as the focal line 7 so that the focal line 7 is focused directly on the paper when the alignment end 7 abuts the paper. Of course, if it is desired to scan the slit image at the focal line 7 along the paper 21, it is necessary to slide the ellipsoidal head 1 in the desired direction while maintaining the alignment end 19 in contact with the paper 21. Thus, the ellipsoidal head may be easily maintained in proper alignment with the paper 21 at all times.

It will be appreciated by those skilled in the art that such an automatic alignment process is particularly important if the ellipsoidal head is used as a hand-held optical reader, for example, such as is used to read coded marks on supermarket products. Alternatively, the ellipsoidal head 1 may be affixed to a transparent scanning surface and an article having coded marks may be moved across the scanning surface and scanned by the irradiating image at the focal line 7.

The reflected radiation from the surface of the paper 21 is picked up by optical fibers 23 that are affixed, for example, by glue, to a flat surface of the ellipsoidal head 1. The optical fibers 23 are employed to carry the reflected light from the surface 21 to a corresponding photodetector 25, for example, a charge coupled device. It will be appreciated by those skilled in the art that the photodetector 25 is employed to generate electrical signals corresponding to the intensity of the light that is reflected from the paper 21. The electrical signals may be analyzed to determine the optical pattern on the irradiated portion of the paper.

Figure 2:
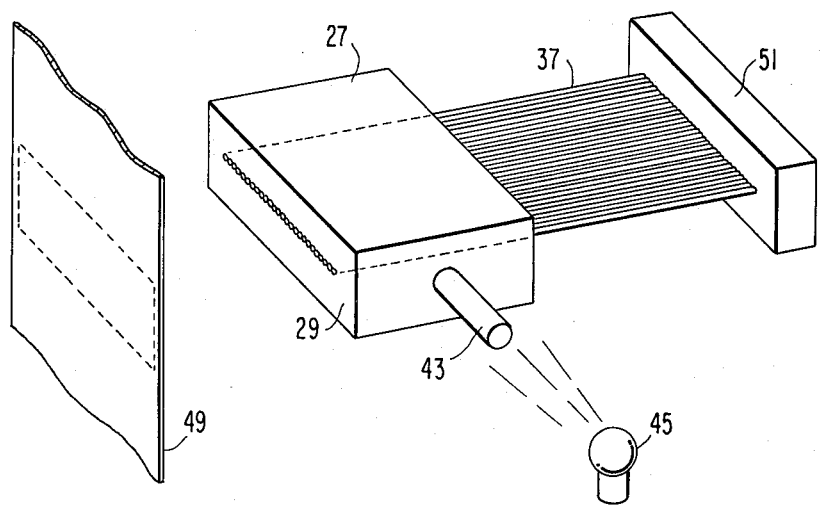
FIG. 2 illustrates a perspective view of an alternative embodiment of the invention.

FIG. 2 illustrates an alternative embodiment of the invention wherein a transparent block 27, for example, of lucite, is employed as a source of illumination and as a pickup head. Optical fibers 37 are embedded in the lucite block with the light pickup ends of the fibers positioned in the plane of a transparent face 29 of the block. The optical fibers may be easily embedded in the block if the block is formed by molding. Alternatively, the block may be assembled from two mating pieces having matching grooves. The optical fibers may be placed in position within the grooves of one piece and the other piece may then be glued into mating contact with the first piece to secure the fibers in place.

The sides of each of the optical fibers 37 are painted with a non-reflective paint to ensure that each fiber receives light only from the exposed end adjacent the transparent face 29. However, it should be understood that the invention is intended to include an illumination and pickup head wherein the fibers are not painted.

All of the external surfaces of the lucite block 27, with the exception of the front transparent wall 29 and a light input area of one wall, are coated with a reflective material, for example, aluminum paint. A light pipe or bundle of optical fibers 43 is affixed to the transparent light input area, for example, by gluing, and an associated light source 45, for example, a light emitting diode or an incandescent lamp, is operated to transmit light through the light pipe or bundle of optical fibers 43 to the interior of the lucite block 27. The transmitted light is internally reflected from the reflective walls of the lucite block 27 and is uniformly emitted from the transparent front wall 29 of the lucite block to irradiate a surface, for example, a paper 49. The reflected light from the paper 49 is picked up by the optical fibers 37 and is transmitted by the fibers to a photodetector 51 that generates electrical signals corresponding to the intensity of the light.

It should be appreciated that other geometrical shapes may be employed to receive light from a light input area and to transmit light by internal reflection to a light output area, without departing from the spirit of the invention.

In addition, it should be understood that the illumination and pickup heads of FIGS. 1 and 2 need not be constructed from solid blocks of transparent material. For example, the reflecting surfaces of the block 27 or the head 1 may be defined by walls having a reflective coating on an interior reflecting surface.

It has been experimentally determined that an ellipsoidal head 1 having a major axis of 2 inches, a minor axis of 1.5 inches and a thickness of 0.3 inches may be conveniently used to illuminate and receive reflected light from characters on a sheet of paper. However, the invention is not limited to any particular dimensioning of the ellipsoidal head.

Thus, the invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. Apparatus for focusing source radiation on a surface and receiving radiation which is reflected from said surface, comprising:
   unitary reflecting means having at least one reflecting surface for reflecting source radiation from an input focal line to an output focal line to form an illuminating slit image at said output focal line,
   alignment means forming part of said unitary reflecting means abutting said surface for aligning said reflecting means to maintain said output focal line and the associated slit image focused on said surface, and,
   light receiving means mounted in fixed positional relationship to said reflecting means and spaced from said surface when said alignment means aligns said reflecting means, for receiving light which is reflected from said surface.

2. The apparatus of claim 1 wherein said unitary reflecting means includes refraction inhibition means which is comprised of a transparent output face shaped to form a portion of a circular cylinder having its axis coinciding with said output focal line, said reflected radiation being passed normal to the cylindrical surface of said transparent output face.

3. Apparatus for focusing source radiation on a surface, comprising:
   reflecting means having,
   at least one internal reflecting face for defining an input focal line and an output focal line;
   radiation input means for applying said source radiation at said input focal line;
   radiation output means for passing the source radiation reflected from said at least one internal reflecting face to form an illuminating slit image at said output focal line adjacent said surface,
   said radiation output means including radiation output transparent face means for passing said internally reflected radiation while inhibiting refraction thereof.

4. The apparatus of claim 3 further including alignment means comprising a surface of said reflecting means adjacent said output face for maintaining said output focal line and the associated illuminating slit image focused in position on said surface.

5. The apparatus of claim 4 wherein said alignment means is in abutting relation to said surface being irradiated to align said illuminating slit image with respect to said surface.

6. The apparatus of claim 5 wherein said transparent output face means is shaped to form a portion of a circular cylinder having its axis coinciding with said output focal line, said internally reflected radiation being passed normal to the cylindrical surface of said transparent output face.

7. The apparatus of claim 6 wherein said at least one internal reflecting face is formed in the shape of an ellipsoid.

8. The apparatus of claim 7 wherein said radiation input means includes at least one optical fiber having a radiation input end for receiving said source radiation and a radiation output end disposed at said input focal line for emitting the source radiation.

9. The apparatus of claim 4 including light transmission means secured adjacent said radiation output means for transmitting radiation from said surface to a detection location.

10. The apparatus of claim 9 wherein said transmission means includes at least one optical fiber.

11. The apparatus of claim 9 including a radiation detector means disposed at said detection location for receiving the radiation transmitted by said radiation transmission means and for generating electrical signals corresponding to the intensity of the transmitted radiation.

12. Apparatus for focusing source radiation on a surface, comprising:
    block means comprised of radiation transparent material and having an ellipsoidally shaped internally reflecting face defining an input focal line located inside of said block means and an output focal line located outside of said block means;
    input means for applying said source radiation at said input focal line;
    output means for passing radiation reflected from said internally reflecting face to form an illuminating slit image at said output focal line,
    one surface of said block means adjacent said output means comprising alignment means for abutting said surface to maintain said illuminating slit image in focus thereon.

13. The apparatus of claim 12 wherein said output means comprises a radiation transparent face shaped to form a portion of a circular cylinder having an axis coinciding with said output focal line.

14. The apparatus of claim 13 wherein said input means includes at least one optical fiber having an input end for receiving said source radiation and a radiation output end positioned at said input focal line for emitting the source radiation.

15. The apparatus of claim 14 including at least one optical fiber positioned adjacent said output means for receiving radiation and transmitting the received radiation to a detection location.

16. The apparatus of claim 15 including detector means disposed at said detection location for receiving the radiation transmitted by said at least one optical fiber and generating an electrical signal corresponding to the intensity of the transmitted radiation.

* * * * *

UNITED STATES PATENT AND TRADEMARK OFFICE
CERTIFICATE OF CORRECTION

PATENT NO. : 4,287,414

DATED : September 1, 1981

INVENTOR(S) : Suk S. Soo and Andrew M. Schwartz

It is certified that error appears in the above—identified patent and that said Letters Patent is hereby corrected as shown below:

Column 2, line 4, change "axits" to -- exits --.

Signed and Sealed this

Seventeenth Day of November 1981

[SEAL]

Attest:

GERALD J. MOSSINGHOFF

*Attesting Officer*    *Commissioner of Patents and Trademarks*